United States Patent [19]

Hellander

[11] 4,382,580
[45] May 10, 1983

[54] LIFTING AND SHIFTING APPARATUS

[75] Inventor: Karl A. Hellander, Gothenburg, Sweden

[73] Assignee: Handelsbolaget Rodoverken, Gothenburg, Sweden

[21] Appl. No.: 224,510

[22] PCT Filed: Apr. 11, 1980

[86] PCT No.: PCT/SE80/00106

§ 371 Date: Dec. 11, 1980

§ 102(e) Date: Nov. 17, 1980

[87] PCT Pub. No.: WO80/02172

PCT Pub. Date: Oct. 16, 1980

[30] Foreign Application Priority Data

Apr. 11, 1979 [SE] Sweden .................. 7903236

[51] Int. Cl.³ .................................. B21D 39/03
[52] U.S. Cl. ...................... 254/89 H; 254/104; 29/429
[58] Field of Search .............. 248/180; 29/429–431; 52/745–747; 254/93 R, 89 H, 84, 104

[56] References Cited

U.S. PATENT DOCUMENTS 2,866,261 12/1958 Macku .
3,182,958 5/1965 Peterzon-Arbella .
3,774,352 11/1973 Weber .................. 254/104
4,067,097 1/1978 Okamoto .............. 29/429
4,078,295 3/1978 Koller .................. 29/429

FOREIGN PATENT DOCUMENTS 196283 5/1965 Sweden .
2014442 8/1979 United Kingdom .

Primary Examiner—Robert C. Watson
Attorney, Agent, or Firm—Pollock, Vande Sande & Priddy

[57] ABSTRACT

An apparatus for lifting and shifting the upper sweep (6) in relation to the lower sweep (2) in the construction of a large cylindrical cistern, comprising a support member (1) hung on the upper edge (3) of the lower sweep (2) and provided with an upstanding carrier body (16). The upper edge of the latter extends parallel to the upper edge (3) of the lower sweep (2) to form a track (19). The carrier body (16) carries a lift member (32) which in turn carries the upper sweep (6). The lift member (32) is formed as a yoke, the cross portion of which rests on a wedge-shaped shifting member (24) in turn resting on the carrier body (16). The wedge (24) is reciprocably displaceable parallel to the lower sweep edge (2) with the aid of a hydraulic cylinder (22). During a first phase of the forward travel, the lift member (32) and the upper sweep (6) are solely given a lifting movement, and during a subsequent forward movement the lift member and the upper sweep are also given a shifting movement. At the return movement of the wedge, the lift member (32) and the sweep (6) are first lowered in their shifted position, whereafter only the wedge (24) and the lift member (32) are returned to their initial positions.

11 Claims, 5 Drawing Figures

LIFTING AND SHIFTING APPARATUS

The present invention relates to a lifting and shifting apparatus in accordance with the preamble to the appended patent claim 1. The invention particularly relates to such a device for use in the erection of large cylindrical plated cisterns, the plates being arranged along a helix in the sweep, which is built up to the desired height by new plates being added at its lower end simultaneously as the sweep is shifted upwards along the helix. This method of erecting a cylindrical cistern is described inter alia in the U.S. Pat. Nos. 2,866,261 and 3,182,958. According to the first-mentioned patent specification, geared motors are used to drive the sweep upwards along the helix or screw line. According to U.S. Pat. No. 3,182,958, the upper sweep is driven with the aid of a plurality of jacks arranged between the lower edge of the upper sweep and the upper edge of the lower sweep. All these jacks lift the upper mantle simultaneously and then tip forward in the direction of the screw line, the mantle thus being rotated upwardly. The arrangement with jacks is cheaper than a plurality of geared motors, but can cause problems in the form of shock stresses at the end of each forward shift. It is further known from U.S. Pat. No. 4,078,295 to support the upper sweep with the aid of rollers in order to shift it forward along the screw line, these rollers being caused to roll in planes sloping forwards-downwards. In this case the sweep is first lifted and then rolled downwards-forwards under its own weight. The rolling movement is arrested by the upper sweep knocking against the lower one, giving rise to troublesome shocks. Alternatively, the upper sweep portion glides along the lower one with great wear as a result. Control of movement is poor.

The purpose of the present invention is primarily to avoid these disadvantages with an apparatus allowing a smooth and controlled lifting and shifting movement which is not terminated by a heavy shock and which does not cause wear as a result of any scuffing movement of the sweep edge. In accordance with the invention, this is achieved with a device having the characterizing features disclosed in the patent claim 1.

The initial lifting motion of the upper sweep is thus provided by a kind of wedge action, the sweep being maintained unmoved in the shifting direction. In accordance with a preferred embodiment of the invention, this is achieved by the track of the member which is lifted (referred to hereinafter as the lift member) sloping just sufficiently in the shifting direction so that the resultant acting on the upper body in the forward direction is less than the resistance to movement counteracting the movement of the upper body. This resistance is generated, e.g. in plated cisterns, by the friction between the bottom portion of the sweep and guide rollers which guide this portion laterally.

The shift member is preferably formed as a wedge, there being rollers arranged between coacting tracks. According to a preferred embodiment of the invention, arresting means are furthermore arranged between the shift member and the lift member and adapted for coming into action after a first phase of the shift member travel. The lift member is thus moved by the shifting mechanism of the shift member, special members providing travel for this purpose thus being dispensed with.

An embodiment of the invention is described below while referring to the accompanying drawings, where FIG. 1 illustrates from one side and partly in section along the line I—I in FIG. 5 a lifting and shifting apparatus in accordance with the invention, mounted between the upper and lower sweeps of a cylindrical cistern under construction.

In a corresponding way,

Figure 1:
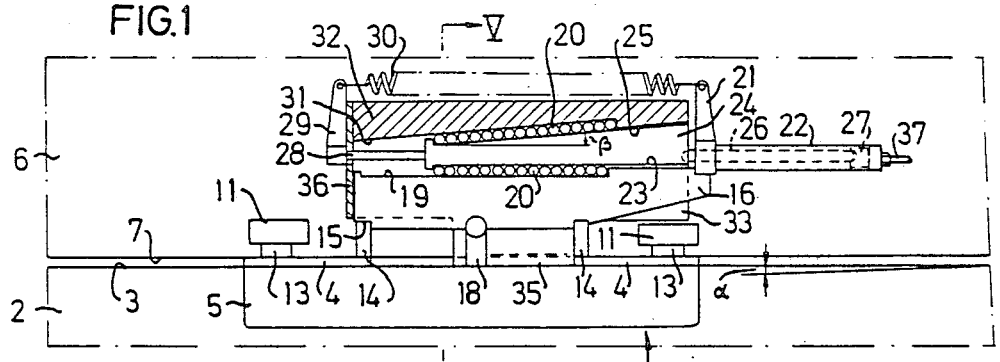

The support member 1 of the apparatus is hung on the upper edge 3 of the lower cistern sweep 2 and is formed as a channel-shaped frame, the web of which is formed by two horizontal spacer plates 4, each having one end welded to a square tube 5 running along the lower sweep 2. The spacers 4 rest on the sweep edge 3, and in the initial position, illustrated in FIG. 5, the lower edge 7 of the upper sweep 6 rests on said spacers 4. The square tube 5 thus forms one channel flange, while the other flange is formed by one or more legs 8 attached to the spacers 4 on the other side of the lower sweep 2. Set screws 9 extend through threaded holes in the legs 8 and can be tightened against the sweep 2 for locking the support member or frame 1 thereto.

On the upper side of each spacer 4 there are two guide rollers 10,11 carried by stub shafts 12,13 and arranged on either side of the upper sweep 6 to guide it laterally. Above this square tube 5 the edges of the spacers 4 facing towards each other are each provided with a perpendicularly upstanding guide block 14, the upper face of which is formed as a slide surface 15. A carrier member 16 rests on the slide surfaces 15 and extends parallel to the upper sweep 6, and is formed at its bottom edge such that it is not displaceable longitudinally along the sweep 6. On the other hand, the carrier body 16 can slide to and from the sweep 6 on the slide surfaces 15. The carrier body 16 is acted on by a spring-loaded pin 17 in a direction towards the sweep 6, this pin being carried in a post 18 upstanding from the square tube 5 between the spacers 4. The upper edge of the carrier member 16 has a track 19 for a plurality of rollers 20. Associated with the support member 1 there is also a post 21 on the right-hand end of the carrier body 16 in FIG. 1, the upper end of this post being formed as a spring anchorage, its lower portion forming a mounting for one end of a single-acting hydraulic cylinder 22, extending parallel to the track 19.

There is a shift means in the form of a wedge 24, resting with its downwardly facing track 23 on the rollers 20 of the track 19. As with the carrier member 16, the wedge 24 is made as an elongate thick plate parallel to the upper sweep 6 and also having an upper track 25 carrying rollers 20, similar to the track 19. The track 25 slopes downwards to the left in FIG. 1. At the right-hand end of the wedge 24 there is a conical recess, not shown specifically. The rounded end of a push rod 26 rests in the recess, the other end of the rod, which is also rounded, resting in a conical recess in the piston 27 of the hydraulic cylinder 22. The push rod 26 is not guided in the mounting of the cylinder 22 to the post 21, but runs through it with large free play, allowing for lateral movement of the wedge 24 in relation to the cylinder 22.

A rod 28 projects in the longitudinal direction of the wedge 24 from the left-hand end of the latter and carries at its end an upstanding post 29, the upper end of which is formed as a spring anchorage. A tension spring 30 is mounted between this anchorage and the anchorage in the post 21 to keep the wedge 24 engaged against the push rod 26.

A lift member 32 with a U-shaped cross section, where the web of the U forms a downwardly facing track 31, rests on the rollers 20 of the upper track 25. The track 31 extends parallel to the upper track 25 of the wedge 24 to carry the lift member 32, which thus hangs as a yoke with its legs 33 and 34 (FIG. 5) on either side of the wedge 24 and carrier member 16. The leg 33, closest to the sweep 6, has its middle portion extended downwards and bent to form a lifting hook 35 extending in between the edges 7 and 3 of the sweep portions 6 and 2. In the initial position illustrated in FIG. 5, the lift member 33 with its lift hook 35 assume their lowest position, in which there is a vertical clearance between the bottom edge 7 of the upper sweep and the upper face of the hook 35 under the edge 7. The lift hook 35 forms an angle of somewhat less than 90° to the leg 33. When the sweep 6 is lifted by the hook 35, the moment thus formed is taken up by the sweep and the hook is locked in position against the sweep so that it cannot slip out. At the beginning of the lifting movement, before the hook engages edge 7, the spring-biassed pin 17 causes the leg 33 to engage the sweep 6.

The rod 28 of the wedge 24 extends out between the legs 33 and 34 of the lift member 32. The left-hand ends of the legs 33 and 34 are interconnected by plates 36 (FIG. 1) which allow through passage of the rod 28 but form a stop for the left-hand end of the wedge 24. The push rod 26 extends outwards between the legs 33 and 34 at the right-hand end of the lift member 32 in FIG. 1.

Figure 3:
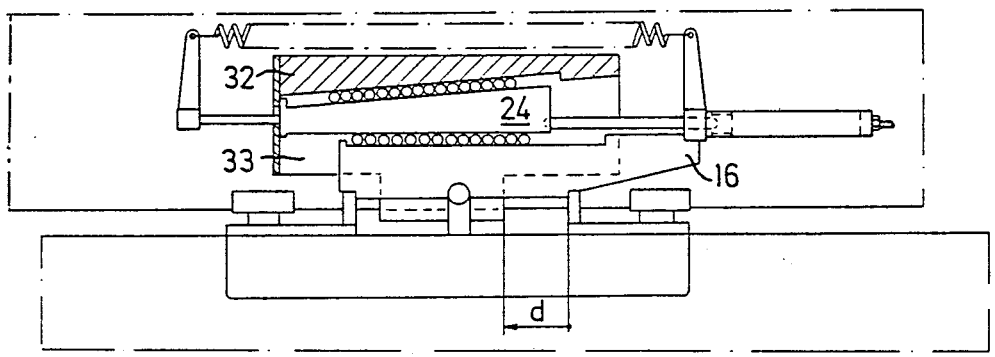

The edges 3 and 7 of the sweeps 2 and 6 run helically and can slope upwards, for example, to the left in FIGS. 1 and 3 at an angle α of 1°–2°. The track 19 of the carrier member 16 is parallel to the upper edge 3 of the lower sweep 2. The angle β between the upper and lower tracks 23 and 25 of the wedge 24 will be selected small enough for the friction and other forces counteracting the shifting movement of the upper sweep 6 to exceed the resultant of the sweep weight acting in the shifting direction. In practice, the taper angle β should be chosen less than about 5° for α≦2°.

For the construction of a cistern, a plurality of lifting and shifting apparatuses in accordance with the figures are arranged at equal spacing around the sweep edge. If each apparatus is dimensioned for about 10 tons, for example, the spacing between the apparatuses can be 2–3 m, depending on the buckling tendency of the sweep plating. All the hydraulic cylinders 22 of the apparatuses are connected via pressure lines 37 in parallel to a common hydraulic pressure source, and thus operate in unison. The clearance between the lift hook 35 and the sweep edge 7 can be about 2 mm.

Figure 2:
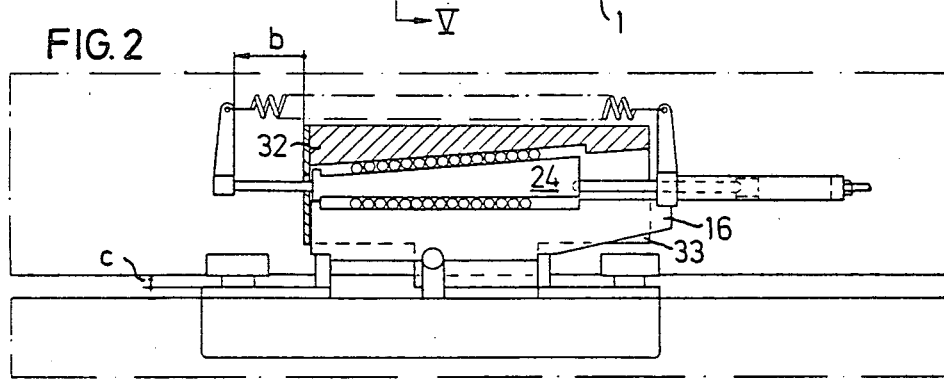
FIGS. 2, 3 and 4 illustrate the apparatus in other operational positions.
Figure 5:
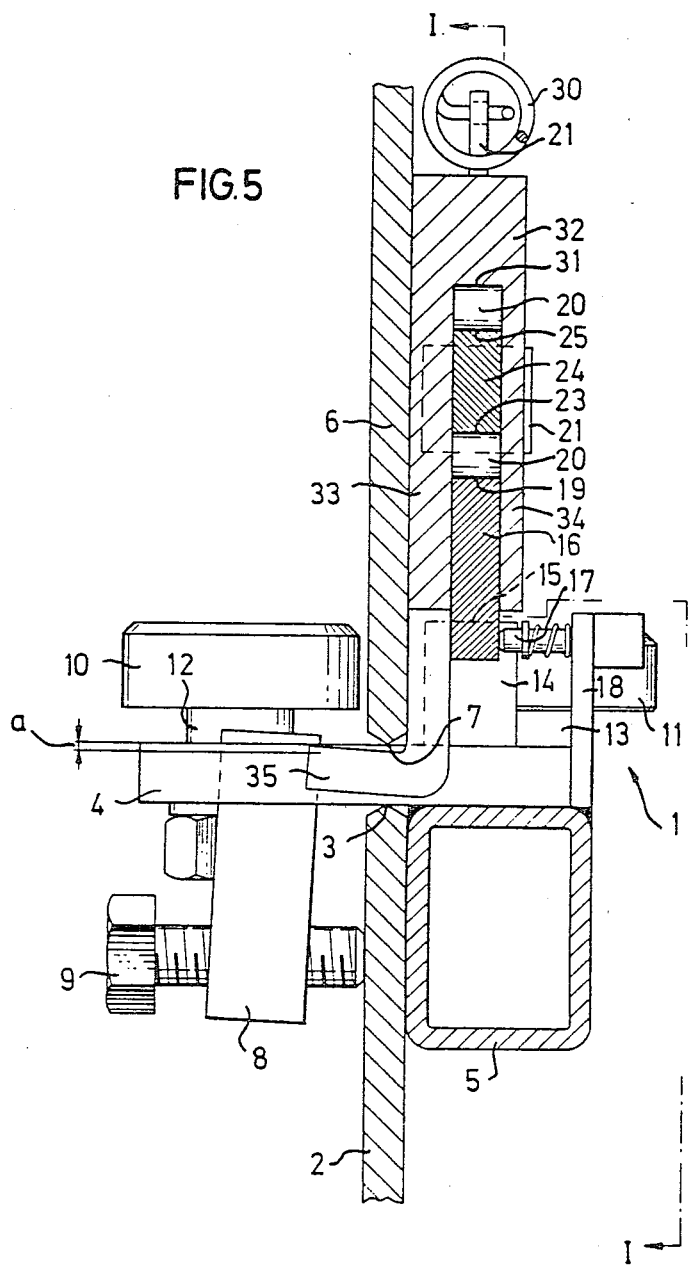
FIG. 5 is a section along the line V—V in FIG. 1 and to a larger scale.

The apparatus functions in the following manner. FIGS. 1 and 5 illustrate the position in which the hydraulic cylinder 22 is unpressurized and the tension spring 30 has returned the wedge 24 to its right-hand end position. The lift member 32 has thus also been lowered to its lowest position and has also assumed its right-hand end position. When the lifting movement is to be started, the hydraulic cylinder 22 is pressurized, the piston 27 and thereby the wedge 24 being shifted to the left a distance b, to the position illustrated in FIG. 2. During this wedging movement the lift member 32 is not shifted and thereby neither is the sweep 6 in the direction of shift travel, but is solely provided with a vertical lifting movement c, (FIG. 2). The wedge 24 travels on the two sets of rollers 20 on tracks 19 and 31.

The lifting distance c is suitably selected at about 8 mm, which is obtained with a piston and wedge travel b of about 140 mm. In the position illustrated in FIG. 2, at the end of the travel b of the wedge 24, the left-hand end of the wedge has just come into engagement against the stop plates 36 on the lift member 32.

On continued piston travel d, the wedge 24 is shifted further to the left, taking with it the lift member 32 by means of its engagement against the plates 36. The wedge 24 now travels only on the rollers 20 on the track 19 of the carrier member 16, and the upper sweep 6 is shifted along and parallel to the lower sweep 2. The motion is continued until the piston 27 has reached its left-hand end position in the cylinder 22. The shifting movement is denoted d, and this position is shown in FIG. 3. The effective shift travel can amount to about 100 mm.

A lifting movement c of about 8 mm is thus obtained with a total piston movement b+d of about 240 mm, which signifies a large force ratio. Smooth lifting and lowering movements are thus obtained and the cylinder 22 can be given small dimensions, e.g., a diameter of merely 30 mm for the above-mentioned lifting force of 10 tons.

Figure 4:
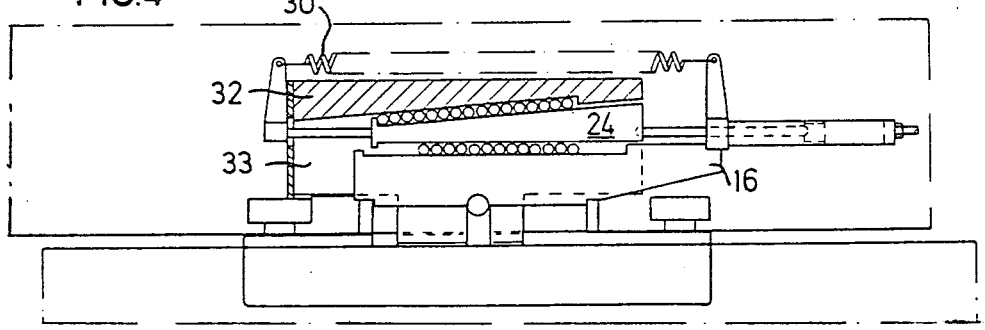

After terminated shifting motion, the pressure in the hydraulic cylinder 22 is reduced. The wedge 24 is moved to the right under the action of the weight of the sweep 6 and the bias of the spring 30. The sweep 6 does not accompany this movement but is lowered perpendicularly to the track 19. The motion will be smooth as a result of the large ratio (b+d)/c. When the sweep 6 has been lowered so that its bottom edge 7 comes to rest on the spacers 4, the position as shown in FIG. 4 has been reached. The hook 35 of lift member 32 is now free below the edge 7. When the pressure is further reduced in the cylinder 22, the wedge 24 as well as the lift member 32 are returned to their right-hand end positions under the action of the tension spring 30, after which the initial position shown in FIG. 1 is again reached.

I claim:

1. An apparatus for lifting and substantially linearly displacing or shifting an upper body (6) in relation to a lower body (2), particularly for lifting and shifting the upper sweep portion (6) of a cistern in relation to its lower sweep (2) in the construction of a cylindrical cistern, comprising
    (a) a support member (1) resting against said lower body (2) and having an upwardly facing track (19) extending substantially horizontally in the direction of the shifting motion;
    (b) a lift member (32) for coaction with said upper body (6) having a downwardly facing track (31) sloping forwardly and downwardly in the direction of the shifting motion, said lift member (32) being movable vertically as well as in the direction of the shifting motion in relation to said support member (1);
    (c) a shift member (24) movably arranged with respect to said support member (1) and lift member (32) and comprising two tracks (23,25), each arranged parallel to, and coacting with the respective one of said tracks (19,31);
    (d) a shifting mechanism (22,30), acting between said support member (1) and shift member (24), for imparting to said shift member (24) reciprocating motion relative to said support member (1);
    (e) means (β) which, under a first phase (b) of the forward travel of the shift member (24) in the shifting direction of said upper body (6), prevents said lift member (32) from participating in this movement, whereby the lift member is given a lifting movement (c); and (f) means (36) for also shifting said lift member (32) under continued motion (d) forwards of said shift member (24) and during return motion of said shift member (24) to shift said lift member (32) only during a terminating portion of its movement, whereby said lift member is first allowed to lower said upper body (6) in its shifted position.

2. An apparatus as claimed in claim 1, comprising stop means (36) between said lift member (32) and said shift member (24) becoming operative after a predetermined portion (b) of the total shifting travel of said shift member (24), to prevent mutual movement between said lift and shift members, whereby said lift member (32) is caused to accompany the continued motion (d) of said shift member (24).

3. An apparatus as claimed in claim 1 or 2, wherein the track (31) slope (β) of said lift member (32) is so selected that the resultant of the upper body weight, acting in the shifting direction on said upper body (6), is less than the resistance to the upper body shifting movement.

4. An apparatus as claimed in claim 3, wherein the track (19) of said support member (1) is parallel to the upper edge (3) of said lower body, formed as the lower cistern sweep (2), and has a slope of about 1° to 2° forwardly-upwardly in the direction of shift motion, the angle (β) between the tracks (23,25) of said shift member (24) being at most about 5°.

5. An apparatus as claimed in claim 4, wherein said shift member (24) is located between the tracks (19,31) of said support and lift members (1,32) and is formed as a wedge the upper and lower sides of which have the tracks (23,35) of said shift member.

6. An apparatus as claimed in claim 5, comprising friction reducing bodies (20) between coacting tracks (19,23 and 25,31, respectively).

7. An apparatus as claimed in claim 6, wherein said friction reducing bodies (20) comprise rollers.

8. An apparatus as claimed in claim 6 wherein said shift mechanism comprises a pressure medium cylinder (22) acting between said support member (1) and said shift member (24).

9. An apparatus as claimed in claim 7, wherein said pressure medium cylinder (22) is single-acting and wherein said shift mechanism further comprises a tension spring (30) acting between said support member (1) and said shift member (24) against the operation of said cylinder.

10. An apparatus as claimed in claim 1, wherein said support member (1) has an elongate yoke, U-shaped in cross-section, adapted to hang with dependent flanges (5,8) and with its web (4) on the upper edge (3) of said lower sweep portion (2) of a plated cistern under construction, the side of said web (4) facing away from said flanges (5,8) being provided with means (10,11) for lateral guidance of the upper sweep (16) of said cistern, and a carrier body (16) being upstanding from said web.

11. An apparatus as claimed in claim 1, wherein said lift member (32) is a channel member U-shaped in cross-section, adapted to ride with dependent legs (33,34) on said shift member (24) upstanding therebetween with its track (31) formed on the inside of said web, one of said legs (33) being extended downwards and bent at an angle to form a hook (35) for carrying said upper body (6).

* * * * *